United States Patent [19]

Wagner et al.

[11] 4,113,289
[45] Sep. 12, 1978

[54] EXHAUST SYSTEM AND MUFFLER LAP JOINT

[75] Inventors: Wayne M. Wagner, Apple Valley; John A. Campbell, Minneapolis, both of Minn.

[73] Assignee: Donaldson Company, Inc., Minneapolis, Minn.

[21] Appl. No.: 773,847

[22] Filed: Mar. 3, 1977

[51] Int. Cl.² ............................................. F16L 21/06
[52] U.S. Cl. .................................. 285/322; 285/382; 285/420
[58] Field of Search .................. 285/382.1, 382.2, 382, 285/420, 419, 253, 252, 7, 322, 424; 24/277, 276, 275, 274, 19, 283, 284, 285, 286, 279; 403/289, 290, 371, 313, 302

[56] References Cited

U.S. PATENT DOCUMENTS

| 382,468 | 5/1888 | Haley | 285/420 |
| 1,255,417 | 2/1918 | Hedges | 285/419 |
| 1,978,195 | 10/1934 | Haas | 24/279 |
| 3,109,052 | 10/1963 | Dumire et al. | 285/382.2 X |
| 3,141,688 | 7/1964 | Taylor, Jr. et al. | 24/279 X |
| 3,944,265 | 3/1976 | Hiemstra et al. | 285/419 |

Primary Examiner—Thomas F. Callaghan
Attorney, Agent, or Firm—Merchant, Gould, Smith, Edell, Welter & Schmidt

[57] ABSTRACT

An improved exhaust conduit lap joint construction is disclosed, wherein the outer tube includes an end portion having therein a plurality of captured take-up slots and a plurality of relief slots which extend through the end of the tube. An inner tube extends telescopically into the outer tube end portion so as to cover the slots from the inside. Clamping means, including means encircling the outer tube and covering the captured take-up slots, hold the two tubes together, whereby a leak proof lap joint is formed.

13 Claims, 8 Drawing Figures

EXHAUST SYSTEM AND MUFFLER LAP JOINT

CROSS-REFERENCE TO RELATED APPLICATIONS

This invention represents an improvement over the invention disclosed and taught in the application filed contemporaneously with this application in the name of Raymond E. Canfield for an "Exhaust Tube End for Lap Joint" Ser. No. 773,848, filed Mar. 3, 1977.

BACKGROUND OF THE INVENTION

1. Field of the Invention

This invention relates generally to the field of gas conduit tubes, and more particularly concerns the construction of leak proof lap joints between telescopically communicating exhaust pipes.

2. Description of the Prior Art

Most automotive exhaust systems provide a conduit for exhaust gas to pass from the point of combustion to a remote outlet, passing through a series of treatment devices such as a muffler, catalytic converter, and resonator. The exhaust gas may also be passed through other devices where it performs a work function, such as in an air cleaner aspirator. In order that such exhaust systems may be assembled, means must be provided for the effective coupling of a number of lengths and shapes of tubing.

The most common way of joining pipes to construct an exhaust conduit is to utilize a lap joint, wherein succeeding tubes of smaller diameter are fitted telescopically into preceding tubes of larger diameter, and clamped in the region where the tubes overlap. Clamping means which encircle the outer tube are tightened down so as to crimp the outer tube onto the inner tube in the region of overlap of the tube ends.

Since most exhaust tubes are made of steel, they generally have one end formed with a plurality of slots running parallel to the longitudinal axis of the tube extending from the tube end inwardly for a distance of one and one half to three inches in order to facilitate the crimping of the outer tube to the inner tube. A number of these slots are placed around the circumference of the outer tube at its end. A typical muffler connecting tube is shown in the patent to Bryant, U.S. Pat. No. 2,825,421. A similar slotted tube end construction is shown in the patent to L. H. Billey, U.S. Pat. No. 3,137,553, for an air cleaner aspirator.

The slots in such an outer tube configuration allow the outer tube to be deformed, or crimped inwardly onto an inner tube placed telescopically within the outer tube, by the action of a clamp encircling the outer tube in the region of the slots. The most common clamping means for use in lap joint construction is the so-called guillotine or saddle-type clamp. Such a clamp comprises a U-bolt having a radius of curvature generally equal to the outside radius of the outer exhaust tube, and a saddle which slides on the free legs of the U-bolt. The saddle and U-bolt are forced towards each other by means of a pair of nuts threadedly engaging the ends of the U-bolt legs. When the nuts are tightened, the saddle and U-bolt cooperate to squeeze the tubes which they encircle.

In the conventional lap joint construction, the inner tube has an outside diameter which is smaller than the inside diameter of the outside tube, and the inner tube extends into the outer tube so as to cover the outer tube slots from the inside. The saddle clamp is then positioned around the outer tube at a point intermediate the length of the slots. When the saddle clamp is tightened, it crimps the outer tube in a localized area. As a result of this localized crimping and the differences in diameters of the inner and outer tubes, gaps are formed between the tube walls upstream of the crimped region. These gaps allow gas to pass between the walls, into the slotted region of the outer tube, and thus escape axially down the slots to the end of the outer tube and radially from the slots around the clamping ring. This leakage of exhaust gas at the lap joint not only presents a safety hazard, because of the escape of noxious exhaust fumes, but also presents a noise problem—the pulsating escape of gases is highly audible.

In order to produce a safe, noise-free exhaust system, the lap joint couplings utilized in the system must be substantially leak-proof. As was pointed out above, the conventional slotting arrangement on the outer tube allows exhaust gas to escape both radially and axially from the slots. While the use of a band-type clamp, which clamps are known in the industry, may prevent to some extent the escape of gas radially from the lap joint, such clamps cannot prevent escape of gas down the slots and out the slot ends. Several devices have been developed to prevent the axial escape of gas at the lap joints. Sipler, U.S. Pat. No. 3,572,774 discloses the use of a flexible gasket which extends past and around the end of the outer tube to engage the inner tube wall. Heimstra et al., U.S. Pat. No. 3,944,265 discloses the use of a band of ductile metal, which is passed around the adjacent ends of the two door members and circumferentially stressed beyond its elastic limit to conform intimitely with the outer surfaces of the members throughout their entire circumferences.

Due to the cost of the special material of which stretchable bands must be made, or of the extra part comprising the gasket seal, these alternative solutions to the problem are not entirely satisfactory for all applications.

SUMMARY OF THE INVENTION

This invention is an improvement over the previously identified Canfield application, wherein the slotting arrangement on the outer tube was modified so that the take-up slots do not extend through the end of the tubular wall of the outer tube, but are "captured". We have combined such an outer tube with band clamping means which encircle the outer pipe and entirely cover each take-up slot so that exhaust gas is prevented from escaping between the outer and inner pipes and axially along the slots, since the slots do not extend through the end of the outer tube.

A further modification of the conventional tube end slotting arrangement in accordance with the present invention involves the placement, in combination with the captured slots, of a plurality of short, relief slots at the end of the outer tube. These short relief slots alleviate any buckling at the otherwise solid end of the outer tube, due to the crimping action of the clamping band. Since these relief slots are short—they do not extend up the tube as far as do the captured take-up slots—they are entirely closed from the inside by the presence of the inner exhaust tube, and thus there is no means of exhaust gas escape from these short relief slots.

Thus, it will be appreciated that an improved exhaust conduit lap joint construction has been invented, which does not entail the use of expensive materials, or extraneous parts, and which is suitable for most, if not all, situations in which lap joints are necessary.

DETAILED DESCRIPTION OF THE PREFERRED EMBODIMENT

Figure 1:
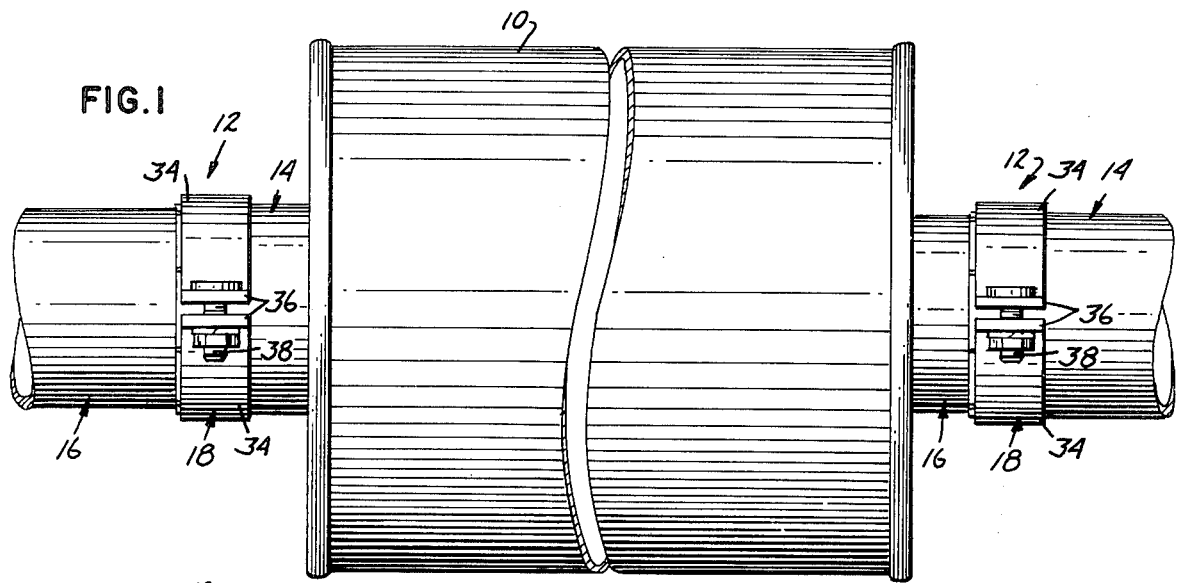
FIG. 1 is a view in side elevation of a typical muffler installed in an exhaust conduit by means of the lap joint of the present invention.

Referring first to FIG. 1, there is shown a portion of an exhaust conduit system which has been assembled using the improved lap joint construction of the present invention. In the view thereshown, a conventional muffler 10 has been plumbed into an exhaust conduit system by means of a pair of lap joints 12 constructed in accordance with the present invention. Each lap joint 12 comprises an outer tube 14 telescopically extending over an inner tube 16, and a clamping band 18 which encircles the outer tube in the region where it overlaps the inner tube. It is understood that the present invention is not limited to the use of lap joints 12 in conjunction only with mufflers. To the contrary, lap joints 12 might be utilized to plumb any suitable device into a gas conduit system, and, in fact, may be used simply to couple lengths of tubing together, such as straight tubes, elbows, etc.

Figure 2:
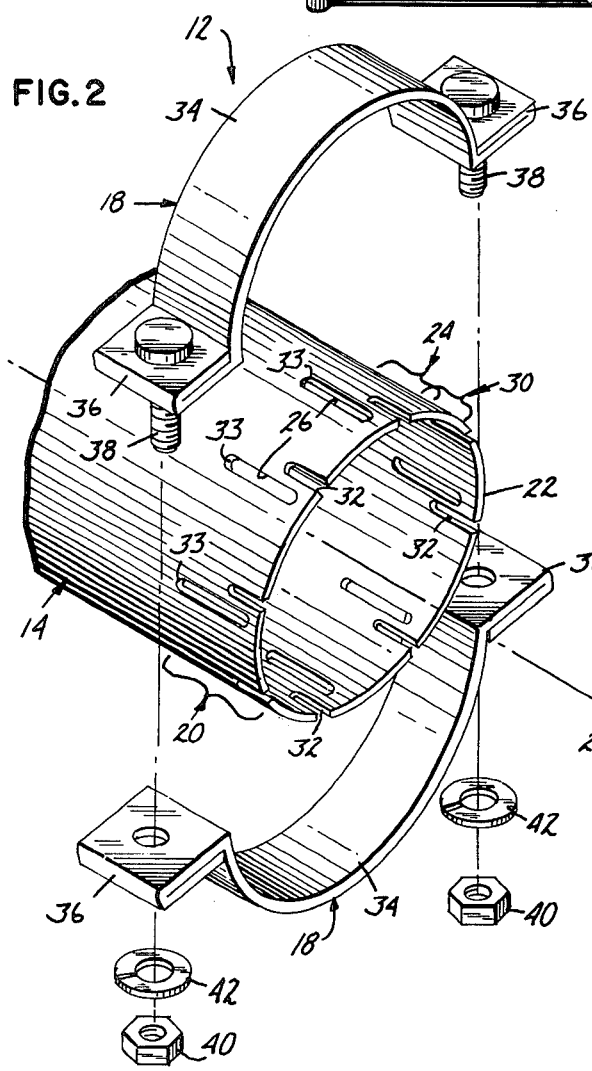
FIG. 2 is an exploded perspective view of the clamping band and outer tube end slotting arrangement of the present invention.

The construction of outer tube 14 is more clearly shown in FIG. 2. As can be seen, outer pipe 14 includes an end portion 20 terminating at free end 22. End portion 20 can be described generally as comprising two overlapping, deformable ring portions. The first of these deformable ring portions, indicated by the numeral 24, is generally defined by a plurality of elongated take-up slots 26 in the tubular wall of pipe 14. Take-up slots 26 are "captured" in that they do not extend to free end 22, but are positioned inboard of free end 22. In the preferred embodiment, take-up slots 26 are disposed annularly around the tubular wall of pipe 14, and are equidistantly disposed from each other. Take-up slots 26 extend parallel to the longitudinal axis 28 of pipe 14.

The second deformable ring portion, designated by the reference numeral 30, is generally defined by a plurality of relief slots 32 annularly disposed around the tubular wall of pipe 14. As can be seen in FIG. 2, relief slots 32 are not captured, since they extend through free end 22 of pipe 14. As is also shown, relief slots 32 do not extend inboard from free end 22 past the inboard ends 33 of take-up slots 26. In this manner, deformable ring portions 24 and 30 slightly overlap each other.

In the preferred embodiment, relief slots 32 are also elongated slots extending parallel to longitudinal axis 28. Slots 32 correspond in number to slots 26, whereby one slot 32 extends into a region of the tubular wall bounded by two of the take-up slots 26. In the preferred embodiment each relief slot 32 is disposed nearer to one of said take-up slots 26 than to the other of said two take-up slots 26.

In a typical outer pipe slotting arrangement, the following dimensions would be appropriate: for an outer pipe having a diameter of four inches, each take-up slot 26 would be one inch in length, and disposed inboard from free end 22 by a distance of one-quarter inch; the total number of take-up slots 26 is eight, and they are disposed approximately 1.6 inches apart (center line to center line); each take-up slot 26 has an initial width of approximately 0.18 inches; relief slots 32 are of dimension 0.50 inches by 0.12 inches, are eight in number, and each relief slot 32 is disposed approximately one-quarter inch from its corresponding take-up slot 26. Such dimensions are generally shown in FIG. 2, although it is understood that other dimensions may be used in practicing the invention.

Figure 3:
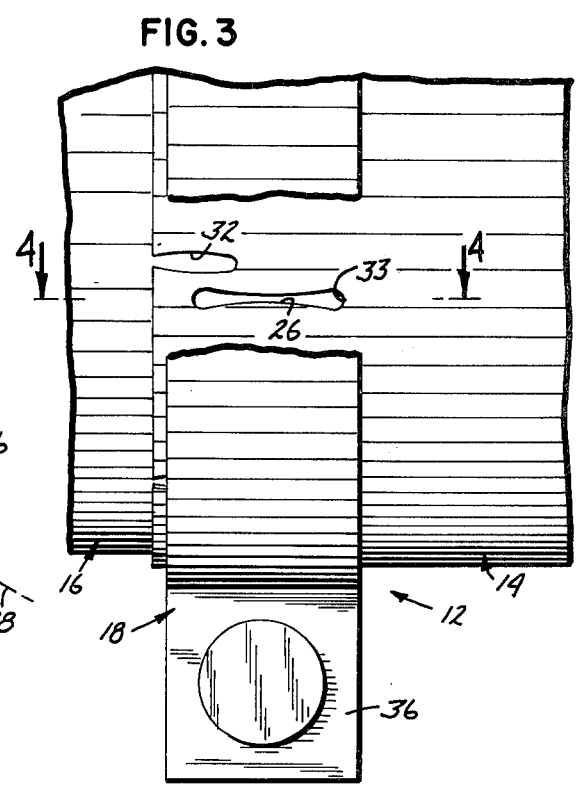
FIG. 3 is a top plan view of a portion of FIG. 1, with portions thereof broken away, showing te shape of the take-up and relief slots after crimping.
Figure 4:
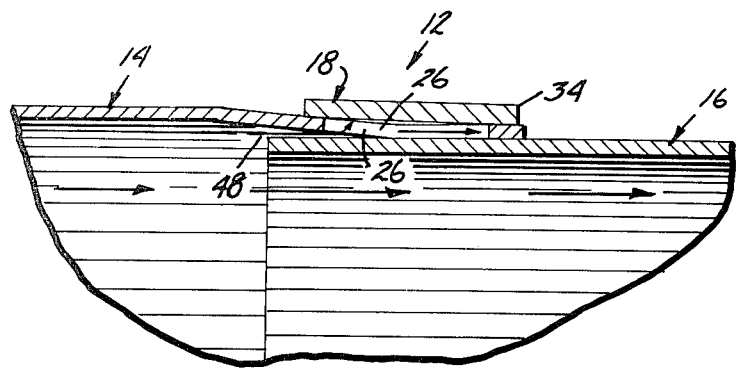
FIG. 4 is a sectional view taken along the line 4—4 of FIG. 3, showing how the axial escape of gas is prevented by the present invention.

As is shown in FIG. 2, the preferred clamping means is a two piece clamping band 18. Each half band 34 of clamping band 18 is generally of a radius equal to the radius of outer pipe 14. In addition, each half band 34 is of sufficient width to cover the take-up slots 26. This relationship is indicated in FIGS. 3 and 4. Half bands 34 include reinforced bolt-guiding ears 36, through which bolts 38 extend. In the preferred embodiment, the head bolts 38 are welded to one of the half bands 34. When the half bands 34 are positioned around outer pipe 14 so that all of the take-up slots 26 are covered, they are tightened together by means of nuts 40 and lock washers 42. By utilizing the two bolt construction, convenient, sturdy means for attaching the conduit to a support member, or for using the conduit as a support member for some other device, are provided.

Figure 8:
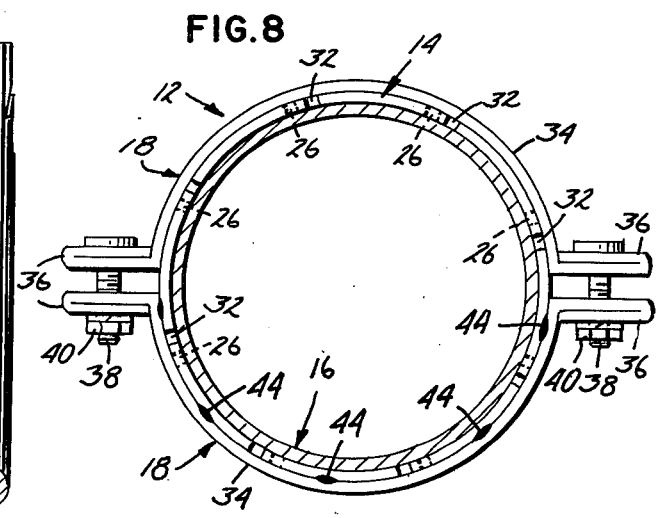
FIG. 8 is a view in end elevation of a tube end constructed in accordance with the present invention, having a half band spot welded in position thereon.

As is shown in FIG. 8, in order to insure the proper positioning of clamping band 18, i.e. so that all take-up slots 26 are covered, one of half bands 34 may be spot welded to outer pipe 14 at the points indicated by reference numeral 44.

Figure 5:
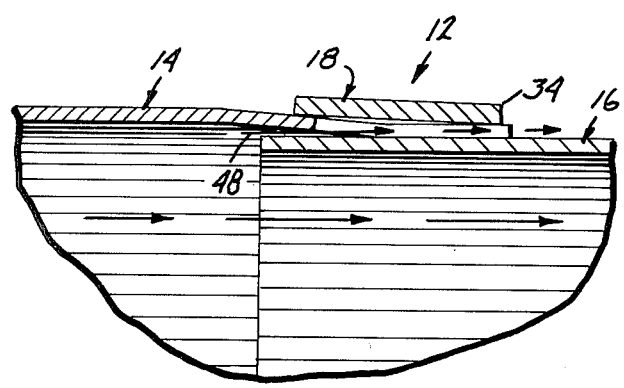
FIG. 5 is a view similar to that of FIG. 4, showing the axial escape of gas from a lap joint utilizing the conventional slotting arrangement.
Figure 6:
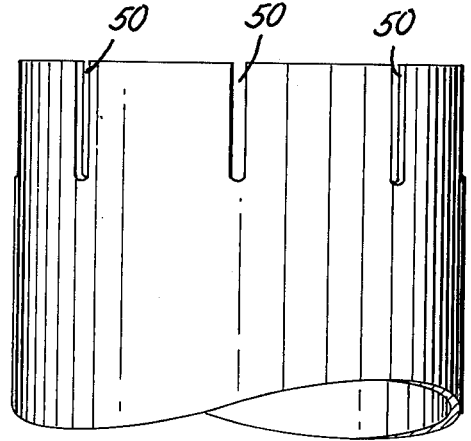
FIG. 6 is a view in side elevation of a conventionally slotted outer exhaust tube.

With inner pipe 16 extending telescopically into outer pipe 14 so that the free end 46 of inner pipe 16 extends past the inboard ends 33 of take-up slots 26, the deformation of outer pipe 14 due to tightening of clamping band 18 is shown in FIGS. 3 and 4. As is most clearly shown in FIG. 4, a gap 48 forms between the tubular wall of inner pipe 16 and the tubular wall of outer pipe 14 at the head of the first deformable ring portion 24. Exhaust gas flows into gap 48 but is prevented from escaping to the outside. The radial escape of exhaust is blocked because clamping band 18 completely covers captured take-up slot 26. The axial escape of exhaust is prevented because slot 26 does not extend through free end 22 of outer pipe 14. As can be seen in FIG. 5, the combination of the clamping band 18 with a conventionally slotted tube, such as the one shown in FIG. 6, does not prevent the axial escape of gas entering gap 48, since the gas may flow down the conventional slot 50 and out the end of the tube.

The shape which captured take-up slots 26 assume upon tightening of band 18, and the function of relief slots 32, is most clearly shown in FIG. 3. In that view, it can be seen that, upon tightening, a captured take-up slot 26 becomes narrower in its middle region. This squeezing together of the tubular wall in the first deformable ring portion 24 tends to cause a slight buckling of the tubular wall in the end portion generally defined by the second deformable ring portion 30. Such a buckling may provide a route for the axial escape of exhaust gas, if it is not relieved by the deformation of relief slots 32. There is no axial or radial escape of gas through relief slots 32 since, as is shown in FIG. 3, inner pipe 16 extends far enough into outer pipe 14 to entirely close relief slots 32 from the inside. The end portion of pipe 16 which extends into pipe 14 contains no slots.

Figure 7:
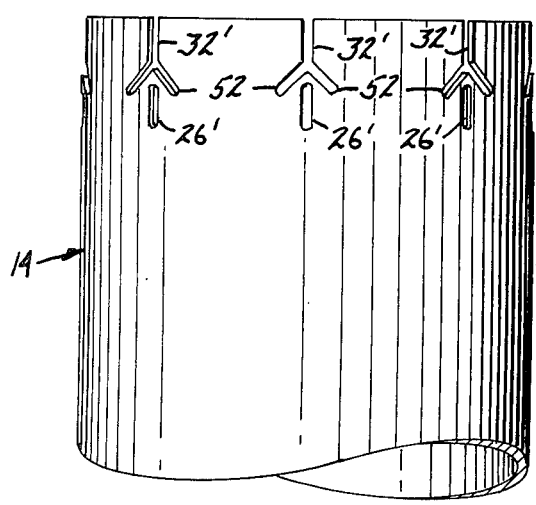
FIG. 7 is a view similar to FIG. 6 of an alternative slotting arrangement in accordance with the present invention.

An alternative slotting arrangement in accordance with the present invention is shown in FIG. 7, the captured takeup slots 26' are aligned with corresponding Y-shaped relief slots 32'. The inboard branches 52 of relief slots 32' extend to either side of their corresponding take-up slot 26'. In such a slotting arrangement, the relief slots 32' perform the same function as described previously for the preferred slotting arrangement. It will be appreciated that other slotting arrangements may also be practiced in accordance with the present invention.

Thus, as has been shown, an improved lap joint construction for exhaust conduit systems has been invented. The improved lap joint is simple in construction, and prevents both the radial and axial escape of gas through gaps formed due to buckling of the outer pipe wall when it is tightened around the inner pipe, resulting in a safer and quieter lap joint than has been heretofore known.

What is claimed is:

1. An exhaust conduit lap joint comprising, in combination:
   a. an inner exhaust pipe having an end portion including a tubular wall;
   b. an outer exhaust pipe having an end portion including a tubular wall with a free end, said tubular wall further having a plurality of captured slots therein, said slots being disposed inboard from said free end, whereby they do not extend through said free end, said end portion of said outer pipe extending telescopically over the end portion of the inner pipe; and
   c. means for clamping the outer pipe to the inner pipe, including means encircling the outer pipe and covering the captured slots for preventing leakage of exhaust gas from the captured slots.

2. The exhaust conduit lap joint of claim 1 wherein the outer pipe further comprises means at the free end for alleviating buckling of the tubular wall when the outer pipe is clamped to the inner pipe.

3. The exhaust conduit lap joint of claim 2 wherein the means for alleviating buckling includes a portion of the tubular wall of the outer pipe defining a plurality of relief slots extending through the free end of the tubular wall, and wherein the inner pipe extends into the outer pipe a sufficient distance to cover said relief slots from the inside.

4. The exhaust conduit lap joint of claim 3 wherein the captured take-up slots are disposed annularly around the outer tubular wall equidistantly from each other, and the relief slots are disposed annularly around the tubular wall equidistantly from each other and are equal in number to the number of captured take-up slots, and wherein each relief slot extends into a portion of the outer tubular wall bounded by two captured take-up slots, each said relief slot being disposed closer to one of said two captured slots than to the other of said two captured slots.

5. A leak proof exhaust conduit lap joint comprising, in combination:
   a. a first exhaust pipe including a tubular wall having a free end, and having a first deformable ring portion generally defined by a plurality of captured take-up slots annularly disposed around the tubular wall near the free end, and further having a second deformable ring portion including the free end, generally defined by a plurality of relief slots annularly disposed around the tubular wall and extending from the free end into, but not past, the first deformable ring portion;
   b. a second exhaust pipe having a free end portion including a tubular wall, which free end portion extends telescopically into the first exhaust pipe from the free end of the first exhaust pipe past the second deformable ring portion, so as to cover the relief slots from the inside; and
   c. means for clamping the first pipe to the second pipe, including pipe deforming means encircling the outer pipe in the region of the first deformable ring portion, and covering the captured slots for preventing leakage of exhaust gas from the captured slots.

6. The exhaust conduit lap joint of claim 5 wherein the means for clamping comprises at least one band, of sufficient width to cover the first deformable ring portion, encircling said first ring portion of the first pipe, and further includes means for tightening said band around said pipe.

7. The exhaust conduit lap joint of claim 5 wherein the last named means comprises two semi-circular bands of sufficient width to cover the first deformable ring portion, positioned so as to encircle and cover said first ring portion of the first pipe, and means for clamping the bands to the pipe.

8. The exhaust conduit lap joint of claim 7 wherein one of said semi-circular bands is permanently affixed to the first pipe so as to cover a portion of the first ring portion of said pipe, and to insure that when the second of said circular bands is mated therewith, it also will cover a portion of the first ring portion of said pipe.

9. A leak proof exhaust conduit lap joint comprising, in combination:
   a. a first exhaust pipe including a tubular wall having a free end, a first deformable ring portion generally defined by a plurality of captured take-up slots annularly disposed around the tubular wall near the free end, and a second deformable ring portion including the free end, generally defined by a plurality of relief slots annularly disposed around the tubular wall and extending from the free end, into but not past the first deformable ring portion;
   b. a second exhaust pipe having a free end portion including a solid, unslotted, tubular wall, which free end portion extends telescopically into the first exhaust pipe from the free end of the first exhaust pipe past the first deformable ring portion so as to cover the relief slots and take-up slots from the inside; and
   c. means for clamping the first pipe to the second pipe, including at least one band of sufficient width to cover the first deformable ring portion, encircling the outer pipe and covering the first deformable ring portion to prevent leakage of exhaust gas from the captured slots.

10. The exhaust conduit lap joint of claim 9 wherein the first exhaust pipe has a longitudinal axis and the captured take-up slots and relief slots are oriented generally parallel to said axis, and wherein each relief slot extends into a portion of the tubular wall bounded by two captured take-up slots, each said relief slot being disposed closer to one of said two take-up slots than to the other of said two take-up slots.

11. The exhaust conduit lap joint of claim 9 wherein the first exhaust pipe has a longitudinal axis and each of the captured take-up slots is oriented generally parallel to said axis, and wherein each of the relief slots is generally Y-shaped, having a portion extending from the free end of the tubular wall parallel to and in line with a corresponding captured take-up slot, and two branch portions, one branch portion extending to one side of the corresponding captured take-up slot and the other branch slot extending to the other side of said take-up slot.

12. A leak proof lap joint comprising, in combination:
 a. an inner pipe having an end portion including a tubular wall of circular cross section;
 b. an outer pipe having an end portion including a tubular wall of circular cross section with a free end, said tubular wall further having a plurality of captured take-up slots therein, said end portion of said outer pipe extending telescopically over the end portion of the inner pipe to dispose the take-up slots over the inner pipe;
 c. means for clamping the outer pipe to the inner pipe by deforming the tubular wall in the region of the take-up slots, including a flat clamping band encircling the outer pipe and covering the captured slots for preventing leakage from the captured slots; and
 d. the outer pipe having a plurality of relief slots opening at the free end for alleviating buckling of the tubular wall when the outer pipe is clamped to the inner pipe.

13. A leak-proof exhaust conduit lap joint comprising, in combination:
 a. a first exhaust pipe having a longitudinal axis and including a tubular wall having a free end, a first deformable ring portion generally defined by a plurality of elongated, captured takeup slots of predetermined length, oriented generally parallel to said longitudinal axis and annularly disposed around the tubular wall near the free end, and a second deformable ring portion including the free end, generally defined by a plurality of relief slots annularly disposed around the tubular wall and extending inboard from the free end into, but not past, the first deformable ring portion, wherein each relief slot extends into a portion of the tubular wall bounded by two captured takeup slots, each said relief slot being disposed closer to one of said two takeup slots than to the other of said two takeup slots;
 b. a second exhaust pipe having a free end portion including a solid, unslotted, tubular wall, which free end portion extends telescopically into the first exhaust pipe from the free end of the first exhaust pipe past the first deformable ring portion so as to cover the relief slots and takeup slots from the inside; and
 c. means for clamping the exhaust pipes together, including a first, generally semicircular band, being in width greater than the length of said takeup slots, said band being affixed to the first pipe in overlying relationship to a semicircular portion of the first deformable ring, entirely covering all takeup slots in said semicircular portion of said first deformable ring, and a second, generally semicircular band, being in width greater than the length of said takeup slots, adapted to mate with said first band to cover the remaining number of takeup slots of said first deformable ring portion.

* * * * *